United States Patent [19]
Miller

[11] Patent Number: 5,907,199
[45] Date of Patent: May 25, 1999

[54] ELECTRIC MOTOR PROVIDING MULTI-DIRECTIONAL OUTPUT

[75] Inventor: Robin Mihekun Miller, Ellington, Conn.

[73] Assignee: UT Automotive Dearborn, Inc., Dearborn, Mich.

[21] Appl. No.: 08/947,706

[22] Filed: Oct. 9, 1997

[51] Int. Cl.$^6$ .......................... H02K 41/02; H02K 16/04
[52] U.S. Cl. .......................... 310/12; 310/268; 310/112; 310/209; 310/191
[58] Field of Search .......................... 310/12, 13, 15, 310/268, 112, 191, 209; 318/115; 90/16, 38

[56] References Cited

U.S. PATENT DOCUMENTS

| | | | |
|---|---|---|---|
| 2,271,207 | 1/1942 | Rhein | 310/209 |
| 2,345,778 | 4/1944 | Lammeren et al. | 172/239 |
| 2,615,945 | 10/1952 | Jaeschke | 310/284 |
| 2,659,237 | 11/1953 | Wood | 74/27 |
| 2,722,617 | 11/1955 | Cluwen et al. | 310/103 |
| 2,953,802 | 9/1960 | Ziegler | 15/250.07 |
| 2,959,803 | 11/1960 | Ziegler | 15/250.02 |
| 3,163,791 | 12/1964 | Carlson | 310/83 |

(List continued on next page.)

FOREIGN PATENT DOCUMENTS

| | | |
|---|---|---|
| 0 345 002 A2 | 6/1989 | European Pat. Off. . |
| 1.281.424 | 12/1961 | France . |
| 822 178 | 11/1951 | Germany . |
| 28 16 207 A1 | 10/1979 | Germany . |
| 3807087 A1 | 9/1989 | Germany . |
| 39 23 688 A1 | 1/1991 | Germany . |
| 43 13 363 A1 | 11/1993 | Germany . |
| 43 37 760 A1 | 5/1994 | Germany . |
| 56-22150 | 2/1981 | Japan . |
| 5-86761 | 4/1993 | Japan . |
| 2 153 218 | 8/1985 | United Kingdom . |
| WO 96/33891 | 10/1996 | WIPO . |
| WO 96/33892 | 10/1996 | WIPO . |
| WO 96/33893 | 10/1996 | WIPO . |

OTHER PUBLICATIONS

"Goodheart–Wilcox Automotive Encyclopedia", William K. Toboldt, Larry Johnson, Steven W. Olive, 1989, pp. 723–727.

"Automotive Handbook", Bosch 3rd Edition, 1993, pp. 694–697.

"Kinematic Analysis of Mechanisms", 1959, J.E. Shigley, pp. 228–231.

"Genevamation Indexing Drives", Jan. 12, 1995 Catalog No. 693, Geneva Mechanisms Corporation.

"Saab 900 Owners Workshop Manual", Haynes Publishing Group, 1979 through 1985, pp. 172–174, 237.

Machine Design, "Basics of Design Engineering", Jun. 1992, Article "Mechanical Systems".

A paper from the Third Conference on Mechanisms, "A Survey of Intermittent–Motion", F.J.Bogardus, 1956, pp. 8–15.

Machine Design, Mechanisms for Intermittent Motion, Dec. 1951, Otto Lichtwitz, pp. 134–148.

"Mechanisms for Providing Intermittent Rotary Motion", Product Engineering, Aug. 1949, pp. 116–117.

(List continued on next page.)

*Primary Examiner*—Nestor Ramirez
*Assistant Examiner*—Karl I. Tamai
*Attorney, Agent, or Firm*—Harness, Dickey & Pierce, P.L.C.

[57] ABSTRACT

An electric pancake motor providing multi-directional output for use in a multi-functional apparatus in an automotive setting. The electric motor may rotate an actuator shaft about its axis to provide rotary output, as well as linearly translate the actuator shaft along its axis to provide axial output. Belleville washers, springs or other elastic members may be use to prevent axial translation of the actuator shaft during normal operations. In another aspect of the present invention, the electric motor may be driven by a single power source and selectively actuates at least two mechanically coupled thereto.

25 Claims, 7 Drawing Sheets

U.S. PATENT DOCUMENTS

| | | | |
|---|---|---|---|
| 3,361,005 | 1/1968 | Carpenter | 74/436 |
| 3,361,947 | 1/1968 | Schlebusch | 310/12 |
| 3,421,380 | 1/1969 | Mansour | 74/84 |
| 3,442,146 | 5/1969 | Simpson | 74/84 |
| 3,443,442 | 5/1969 | Schweihs | 74/1.5 |
| 3,443,455 | 5/1969 | Zugel | 74/820 |
| 3,516,610 | 6/1970 | Stevens | 239/284.1 |
| 3,523,204 | 8/1970 | Rand | 310/94 |
| 3,574,882 | 4/1971 | Petry | 15/250.02 |
| 3,619,676 | 11/1971 | Kawakami | 310/112 |
| 3,659,128 | 4/1972 | Danek | 310/99 |
| 3,665,772 | 5/1972 | Beard et al. | 74/75 |
| 3,688,332 | 9/1972 | Bellware | 15/250.16 |
| 3,689,817 | 9/1972 | Elliott | 318/443 |
| 3,694,723 | 9/1972 | Schneider et al. | 318/443 |
| 3,705,520 | 12/1972 | Carpenter | 74/600 |
| 3,803,627 | 4/1974 | Schuscheng | 343/903 |
| 3,858,922 | 1/1975 | Yamanaka | 292/336.3 |
| 3,917,330 | 11/1975 | Quantz | 292/216 |
| 3,927,436 | 12/1975 | Inoue et al. | 15/250.17 |
| 3,979,619 | 9/1976 | Whitely | 310/268 |
| 4,009,952 | 3/1977 | Badalich et al. | 353/109 |
| 4,065,234 | 12/1977 | Yoshiyuki et al. | 417/420 |
| 4,158,159 | 6/1979 | Orris et al. | 318/443 |
| 4,173,055 | 11/1979 | Izumi et al. | 15/250.02 |
| 4,183,114 | 1/1980 | Eden | 15/250.25 |
| 4,259,624 | 3/1981 | Seibicke | 318/282 |
| 4,271,381 | 6/1981 | Munz et al. | 318/282 |
| 4,309,646 | 1/1982 | Liedtke et al. | 318/443 |
| 4,336,482 | 6/1982 | Goertler et al. | 318/443 |
| 4,352,299 | 10/1982 | Riggs et al. | 74/84 R |
| 4,422,522 | 12/1983 | Slavin et al. | 180/281 |
| 4,434,678 | 3/1984 | Maus | 74/471 R |
| 4,450,390 | 5/1984 | Andrei-Alexandru et al. | 318/282 |
| 4,478,004 | 10/1984 | Andrei-Alexandru et al. | 49/72 |
| 4,492,904 | 1/1985 | Graham | 318/443 |
| 4,507,711 | 3/1985 | Ono et al. | 362/61 |
| 4,553,656 | 11/1985 | Lense | 192/142 R |
| 4,573,723 | 3/1986 | Morita et al. | 292/336.3 |
| 4,630,178 | 12/1986 | Mugford et al. | 362/64 |
| 4,639,065 | 1/1987 | Kohler et al. | 339/119 R |
| 4,660,698 | 4/1987 | Miura | 192/45 |
| 4,674,781 | 6/1987 | Reece et al. | 292/336.3 |
| 4,701,972 | 10/1987 | Saito | 15/250.22 |
| 4,702,117 | 10/1987 | Tsutsumi et al. | 74/89.17 |
| 4,724,760 | 2/1988 | Bubley | 107/115 |
| 4,733,147 | 3/1988 | Muller et al. | 318/443 |
| 4,793,640 | 12/1988 | Stewart, Sr. | 292/201 |
| 4,875,053 | 10/1989 | Harada | 343/903 |
| 4,878,398 | 11/1989 | Heinrich | 74/959 |
| 4,885,512 | 12/1989 | Gille et al. | 318/444 |
| 4,893,039 | 1/1990 | Isii | 310/89 |
| 4,918,272 | 4/1990 | Nishikawa | 200/501 |
| 5,007,131 | 4/1991 | Chevalier et al. | 15/250.19 |
| 5,023,530 | 6/1991 | Ohashi et al. | 318/446 |
| 5,045,741 | 9/1991 | Dvorsky | 310/209 |
| 5,063,317 | 11/1991 | Bruhn | 310/91 |
| 5,182,957 | 2/1993 | Bohmer et al. | 74/42 |
| 5,214,440 | 5/1993 | Takahashi et al. | 343/903 |
| 5,218,255 | 6/1993 | Horiguchi | 310/71 |
| 5,222,775 | 6/1993 | Kato | 292/201 |
| 5,228,239 | 7/1993 | Heo | 49/280 |
| 5,251,114 | 10/1993 | Cantin et al. | 362/286 |
| 5,274,875 | 1/1994 | Chou | 15/250.19 |
| 5,291,109 | 3/1994 | Peter | 310/443 |
| 5,315,735 | 5/1994 | I-Shin | 15/250.22 |
| 5,333,351 | 8/1994 | Sato | 15/250.13 |
| 5,355,061 | 10/1994 | Forhan | 318/443 |
| 5,355,286 | 10/1994 | Flint | 362/65 |
| 5,373,605 | 12/1994 | Austin | 15/250.24 |
| 5,427,345 | 6/1995 | Yamakami et al. | 248/394 |
| 5,462,337 | 10/1995 | Yamakami | 297/344.13 |
| 5,519,258 | 5/1996 | Stroven et al. | 307/10.1 |
| 5,528,959 | 6/1996 | Yamakami | 74/665 GD |
| 5,691,586 | 11/1997 | Yonnet et al. | 310/75 D |
| 5,694,812 | 12/1997 | Maue et al. | 74/471 R |
| 5,730,028 | 3/1998 | Maue et al. | 74/480 R |
| 5,763,981 | 6/1998 | Okazaki et al. | 310/325 |
| 5,844,382 | 12/1998 | Dan | 318/10 |

OTHER PUBLICATIONS

Machine Design, "Mechanisms for Intermittent Motion, Part 2", Jan. 1952, Otto Lichwitz, pp. 127–141.

Machine Design, "Mechanisms for Intermittent Motion, Part 3", Feb. 1952, Otto Lichtwitz, pp. 146–155.

Machine Design, "Mechanisms for Intermittent Motion, Part 4", Mar. 1952, Otto Lichtwitz, pp. 147–155.

A paper from the Third Conference on Mechanisms, "Designing for Intermittent Motion with Modified Starwheels", Karl E. Kist, pp. 16–20.

"Mechanisms for Engineering Design Motion, Circular, Intermittent", Chapter 3, S.B. Tuttle, John Wiley Co., pp. 33–51.

Machine Design, "Modifying Starwheel Mechanisms", Vandeman and Wood, Apr. 1953, pp. 255–261.

"Kinematics of Intermittent Mechanism III—The Spherical Geneva Wheel", Product Engineering, Oct. 1949, S. Rappaport, pp. 137–139.

Machine Design, "Mechanical Systems", Jun. 1992, pp. 130, 132, 168.

"Mechanisms and Dynamics of Machinery", Hamilton H. Mabie and Fred W. Ocvirk, John Wiley & Sons, 1957.

A paper from the International Congress & Exposition, SAE Technical Paper Series 960390, "Liftgate Multiplexed Node", Feb., 1996, H. Winston Maue, pp. 73–76.

Patent Abstracts of Japan, vol. 016, 7–438 (M–1309), Sep. 11, 1992 for JP Patent Publication No. 04151351.

Page 100, *Machine Design,* 60 (1988) Oct. 13, No. 24, Cleveland, Ohio, US.

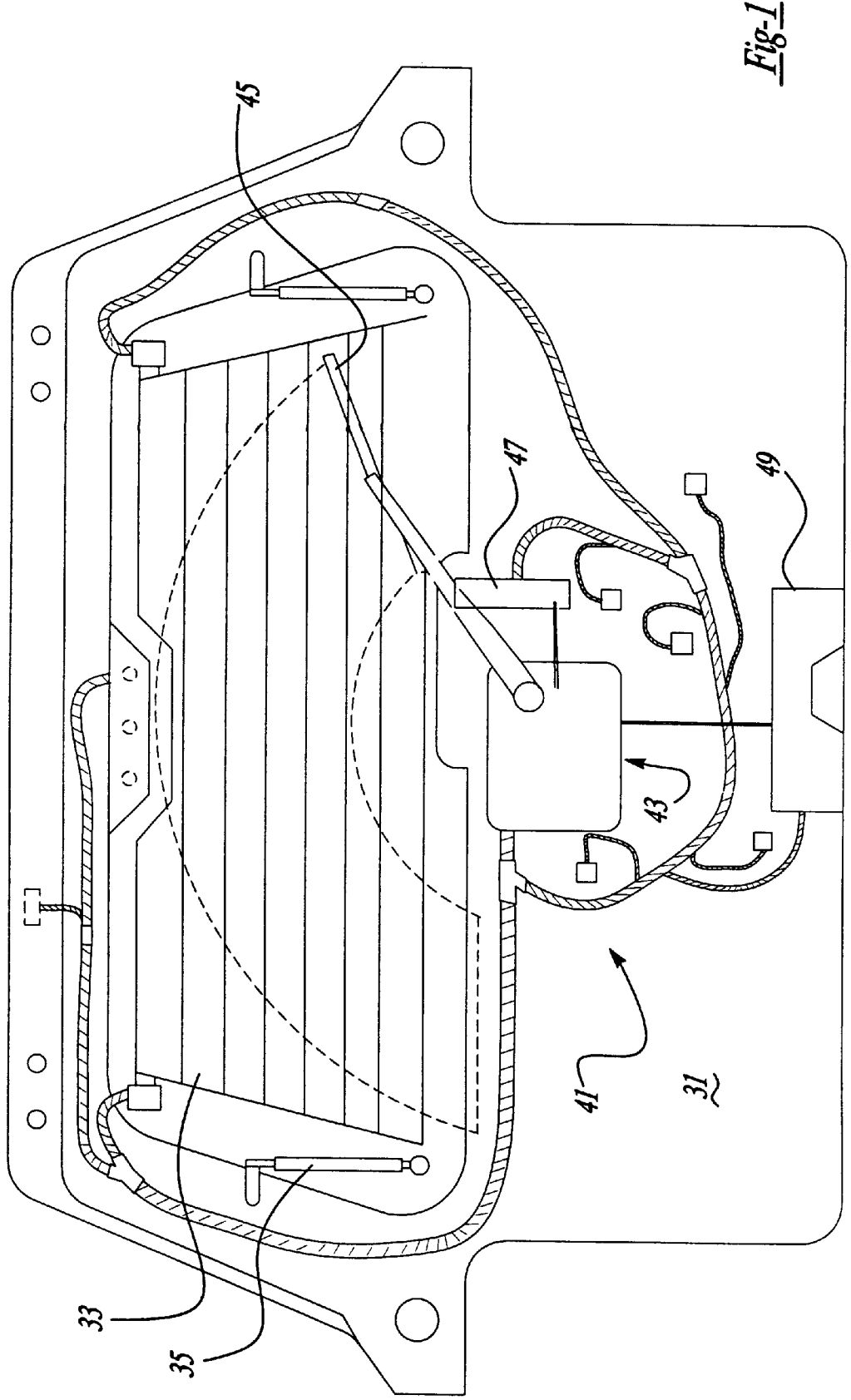

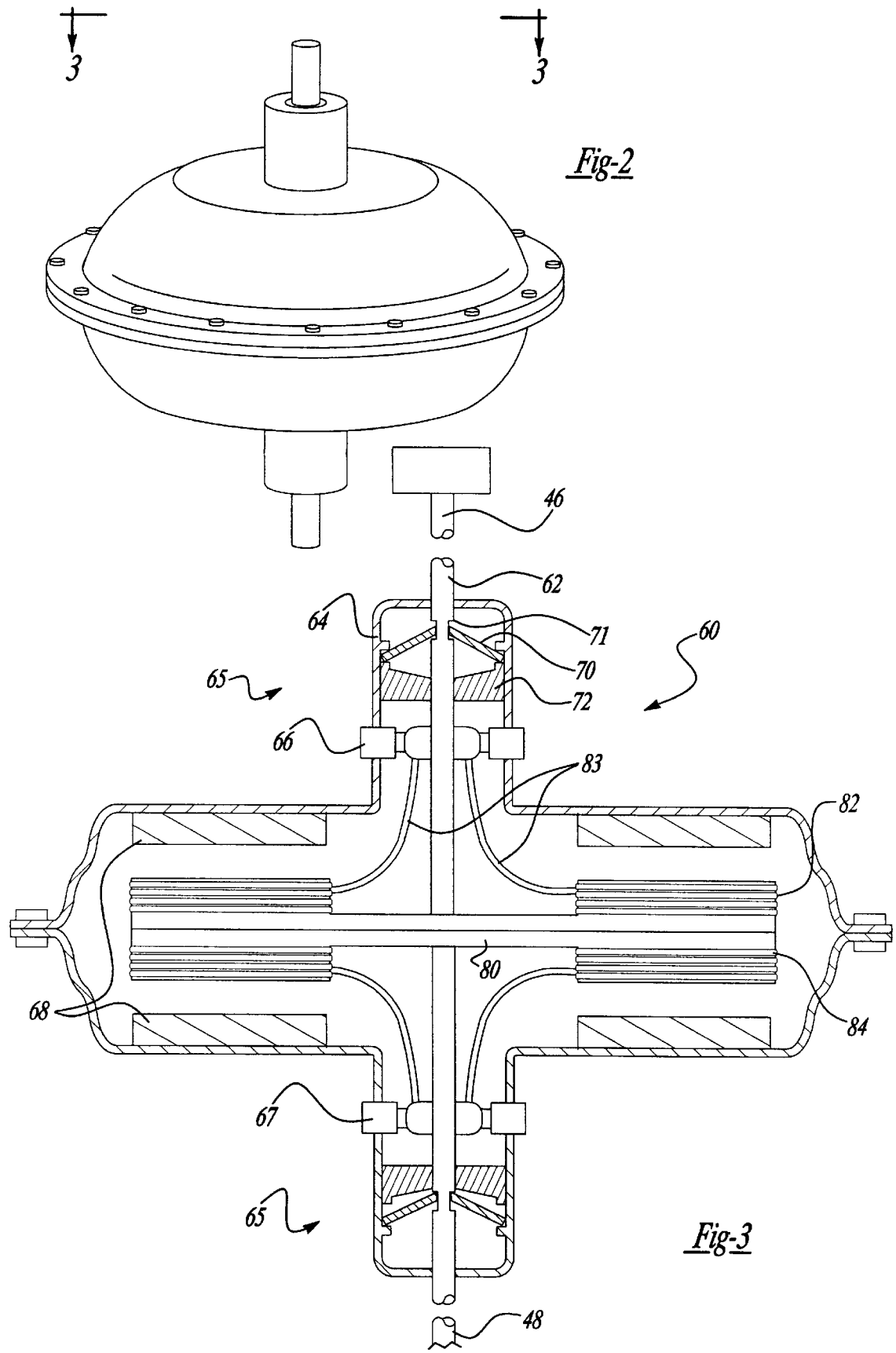

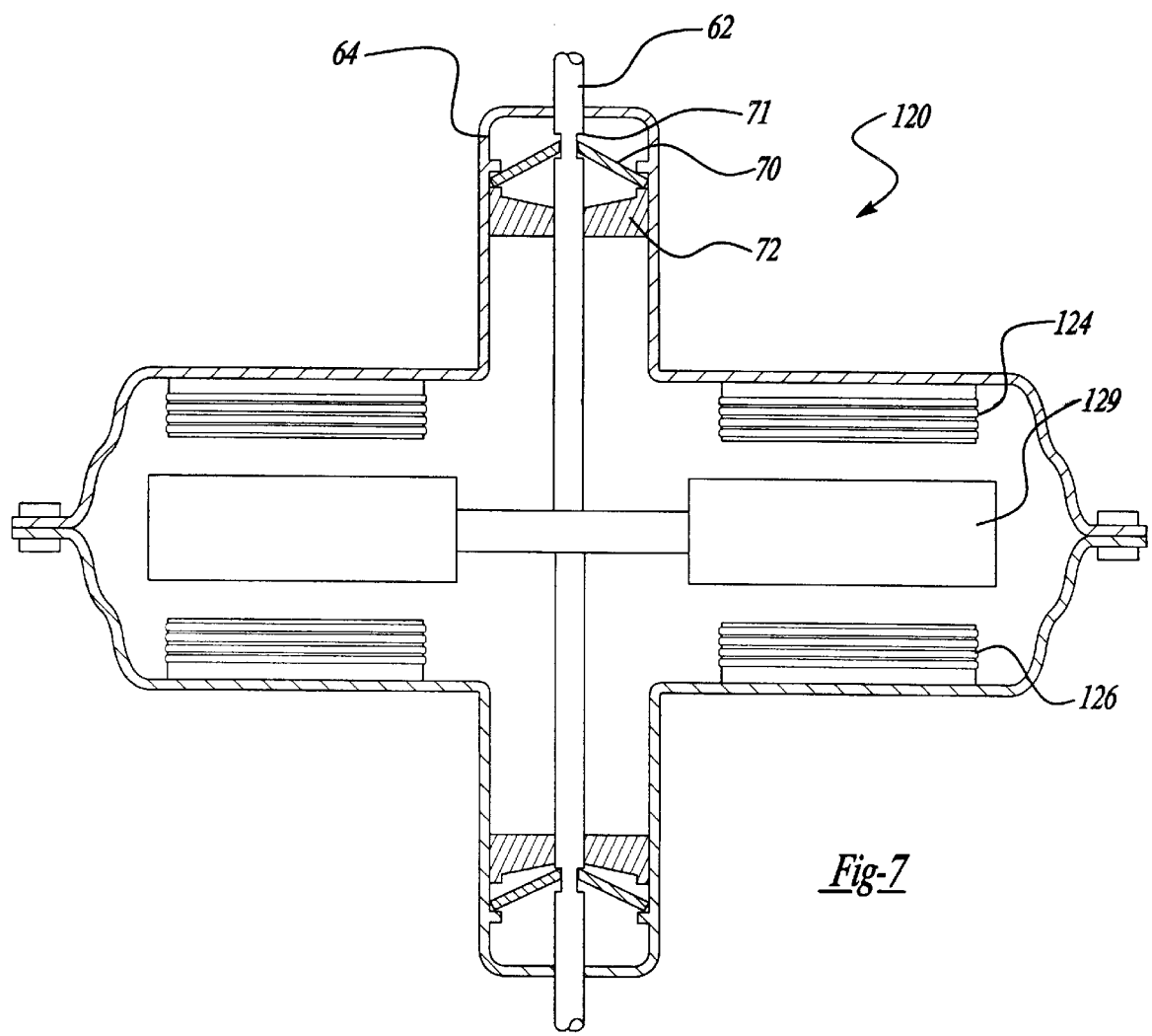

ELECTRIC MOTOR PROVIDING MULTI-DIRECTIONAL OUTPUT

BACKGROUND OF THE INVENTION

This invention relates generally to an electric motor providing multi-directional output and specifically to an axial airgap motor providing rotary and axial output for use in a multi-functional apparatus in an automotive setting.

Almost all automotive vehicles have a single or a pair of windshield wiper assemblies. These assemblies traditionally include rubber wiper blades mounted upon claw brackets. These claw brackets are pivotably attached to wiper arms mounted upon rotating shafts. These shafts are either directly driven by electric motors or driven by a single electric motor which actuates series or parallel-coupled four-bar linkage mechanisms. It is further known to provide a wiper system, in combination with a wash device, to clean headlamps for automotive vehicles.

It is also common to employ a window wiper assembly for cleaning rear windows of automotive vehicles. Typically, these types of rear window wiper assemblies include a wiper blade mounted upon a bracket which is coupled to a wiper arm. The wiper arm is attached to a wiper shaft rotatably driven in a cyclical oscillating manner by a helical gear. A reversible, fractional horsepower, dc electric motor serves to actuate the helical gear through an armature shaft-mounted worm gear enmeshed therewith. This type of rear window wiper arrangement is usually mounted upon a pivoting liftgate of a minivan, station wagon, sport-utility vehicle or the like.

Examples of conventional window wiper assemblies and motor mechanisms are disclosed with the following U.S. Pat. Nos.: 4,893,039 entitled "Windshield Wiper Motor" which issued to Isii on Jan. 9, 1990; 4,878,398 entitled "Driving Device for Window Wiper of Motor Vehicles" which issued to Heinrich on Nov. 7, 1989; 4,336,482 entitled "Rear Window Wiper Motor Control" which issued to Goertler et al. on Jun. 22, 1982; 4,259,624 entitled "Arrangement for Wiping a Vehicle Window" which issued to Seibicke on Mar. 31, 1981; 3,694,723 entitled "Motor Vehicle Windshield Wiper Having a Parking Position Outside the Wiper Area" which issued to Schneider et al. on Sep. 26, 1972; and, 3,665,772 entitled "Windshield Wiper Motor Link Depressed Park Mechanism" which issued to Beard et al. on May 30, 1972. All of these patents are incorporated by reference herewithin.

Some conventional vehicles also provide a rear window release lock or latch, actuated by a solenoid, which can be unlocked to allow for upward pivotal movement of the rear window in relation to the otherwise stationary liftgate. In combination therewith, a separate liftgate lock is often mounted upon the liftgate door for fastening the liftgate to the body to prevent inadvertent pivotal opening. This liftgate lock is traditionally operated by manual key or handle rotation, or through a separate electric motor or solenoid.

Additionally, separate motors or solenoids are required to actuate passenger door locks, an antenna retraction mechanism, headlamp cover retraction mechanisms, a fuel filler door lock and other similar functions. The traditional need for such a multiplicity of electromagnetic devices has increased the automotive vehicle weight and cost while further proving difficult to package within the often small spaces provided. This added weight is especially detrimental when the window wiper mechanism, rear window lock and liftgate lock, as well as their distinct respective electromagnetic devices, are all incorporated within the pivoting liftgate. Not only is the piece cost increased due to this multiplicity of electromagnetic devices, but the assembly cost, part number proliferation and handling costs, electrical wiring costs, objectional motor noise, and failure modes are increased.

Therefore, it would be desirable to provide an electric motor with multi-directional output to be used in an automotive setting. In an automotive multi-functional apparatus, an electric motor selectively actuates two or more motion mechanisms thereby causing three mechanical devices coupled thereto to operate. An example of a radial airgap motor for providing multi-directional output is disclosed in U.S. Pat. No. 5,045,741 entitled Dual-Motion Apparatus which issued on Sep. 3, 1991. However, it would further be desirable to provide an axial airgap motor for providing multi-directional output. This motor may also be used in an automotive multi-functional apparatus.

SUMMARY OF THE INVENTION

In accordance with the present invention, an embodiment of a multi-functional apparatus used in the automotive setting employs an electric pancake motor with multi-directional output. The output from the multi-functional motor of the present invention can selectively actuate at least two mechanically coupled systems. More particularly, the multi-functional motor employs an axial airgap configuration for providing rotary and axial output for use in a multi-functional apparatus.

The multi-functional apparatus of the present invention is advantageous over conventional systems since the present invention combines many different functions into a single electric motor. For example, the multi-functional motor provides rotary motion output which may drive a window wiper and axial motion output which may operate a locking mechanism. The present invention replaces intermediate motion mechanisms needed to translate the motion from a single function conventional motor. Accordingly, the multi-functional motor of the present invention used in conjunction with a multi-functional apparatus significantly reduces the piece cost, assembly cost, part proliferation in handling costs, and wiring costs as compared to a conventional multi-functional apparatus constructions. Furthermore, the multi-functional motor of the present invention significantly reduces weight and packaging space requirements while increasing the electrical and mechanical reliability of the affected systems. Additional advantages and features of the present invention will become apparent from the following description and appended claims, taken in conjunction with the accompanying drawings.

BRIEF DESCRIPTION OF THE DRAWINGS

FIG. 1 is a front elevational view showing a preferred embodiment of a multi-functional apparatus employing an electric motor with multi-directional output;

FIG. 2 is a perspective view showing the multi-functional electric motor of the present invention;

FIG. 3 is a sectional view, taken along line 3—3 of FIG. 2, showing a first preferred embodiment of the multi-functional electric motor of the present invention;

FIG. 7 is a sectional view, taken along line 3—3 of FIG. 2, showing a third preferred embodiment of the multi-functional electric motor of the present invention.

DETAILED DESCRIPTION OF THE PREFERRED EMBODIMENT

Figure 4A:
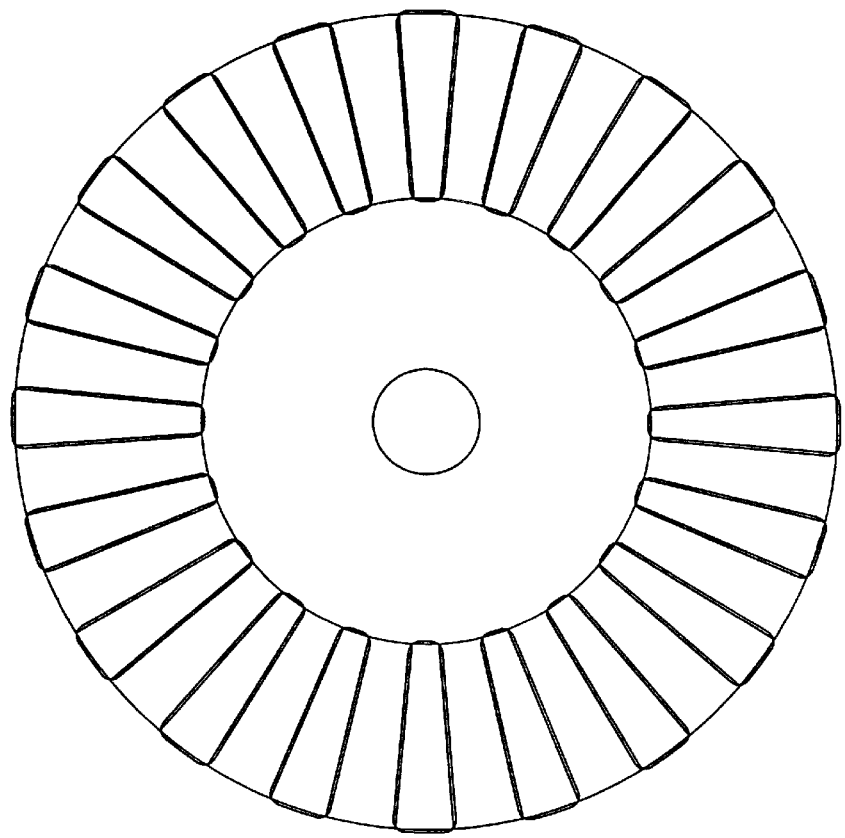
FIG. 4A is a perspective top view showing the axial motor stators used in the multi-functional electric motor of the present invention.

An automotive vehicle, such as a minivan or the like, has a rear liftgate door which can pivot about an upper pair of hinges coupled to the vehicle body structure. When the liftgate is pivoted to an open position, a cargo space is accessible from behind the vehicle. Such a liftgate is shown in FIG. 1. Liftgate 31 has a rear window or back light 33 pivotable between a closed position, substantially flush with the outer surface of liftgate 31, to an open position about upper hinges. A pair of pneumatic cylinders 35 act to push window 33 toward the open position when a lower position of window 33 is released. A multi-functional apparatus 41 is mounted on the inner surface of liftgate 31. The majority of apparatus 41 is hidden by an interior trim panel (not shown). Apparatus 41 includes a central drive and power transmission unit 43, a wiper assembly 45, a window release latch or lock 47 and a liftgate lock 49, all of which are mounted upon liftgate 31. Furthermore, the central drive and power transmission unit 43 includes a multi-functional electric motor of the present invention. This multi-functional electric motor 60 is shown in FIG. 2. While depicting a multi-functional electric motor in the context of a multi-functional apparatus used in an automotive rear liftgate, the following description is intended to adequately teach one skilled in the art to make and use a multi-functional motor in a variety of settings inside and outside of the automotive context.

A first preferred embodiment of multi-functional electric motor 60 is illustrated in FIG. 3 as a conventional dc brush motor used to rotate actuator shaft 62 about its center axis. Multi-functional motor 60 comprises a metallic "hamburger-shaped" motor housing 64 enclosing a portion of a rotatable actuator shaft 62, with actuator shaft 62 protruding from each end of motor housing 64. Motor housing 64 is further shown as a chamber with two hollow protrusions 65 extending from each side of motor chamber 64 for clarity of components. This normally flat motor shape utilizing an axial airgap electromagnetic device is commonly referred to as a pancake motor. A first brush assembly 66 and a second brush assembly 67 are interposed into each of protrusions 65 of motor housing 64. Axial brush contact is also common with pancake motors, and can be used. Coupled along the inside surface of each protrusion 65 are elastic members for restricting axial translation of actuating shaft. In this preferred embodiment, a Belleville washer 70 is shown engaging actuator shaft 62. Bushing and/or bearing members 72 for guiding the rotation of actuating shaft 62 are also shown coupled to on the inside of motor housing 60 adjacent to Belleville washer 70, and actuator shaft 62 is also slotted 71 at each end for engaging each of washers 70.

Figure 4B:
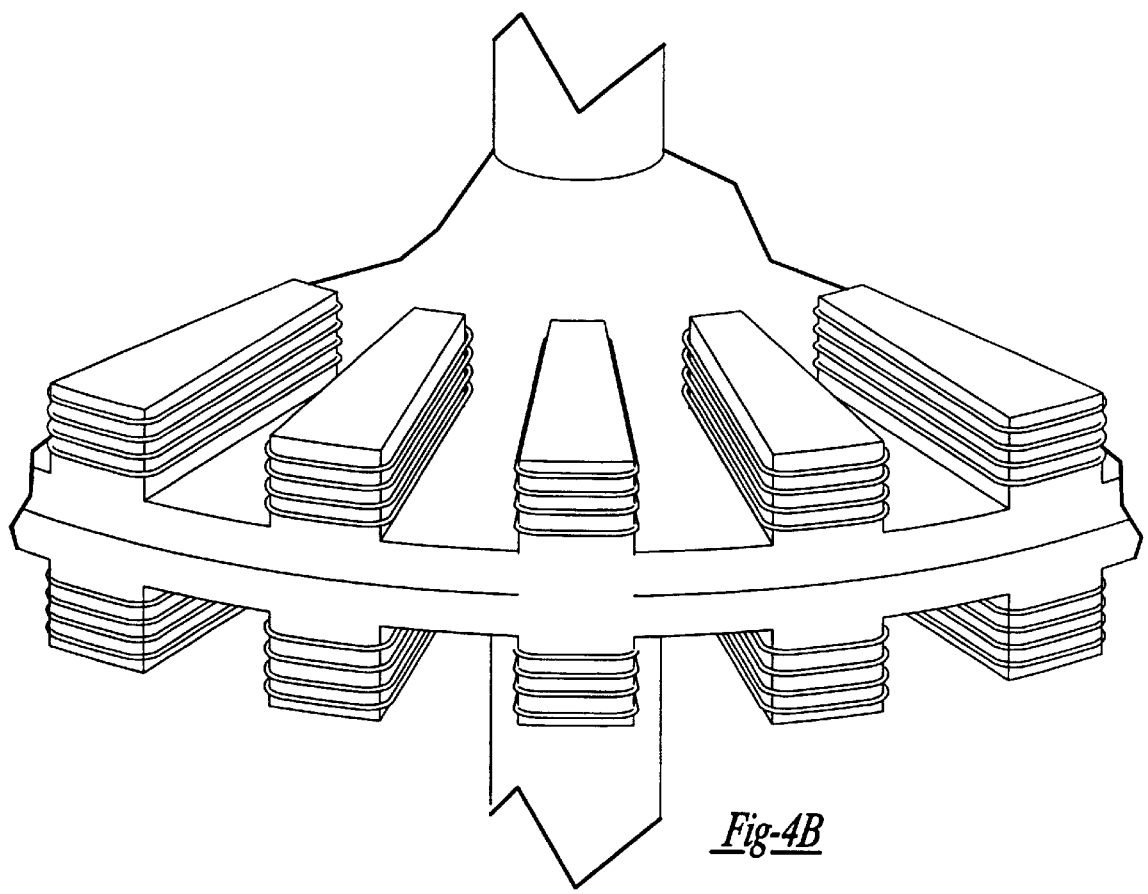
FIG. 4B is a perspective side view showing the axial motor stators used in the multi-functional electric motor of the present invention.

Actuator shaft 62 is further defined to include a rotor 80. On each side of rotor 80 in parallel alignment with each other are two magnetic assemblies 68 coupled to the inside surface of motor housing 64. Magnetic assemblies 68 include a plurality of magnets arranged with alternating fields as is known in the art, and describe a full circumference around actuator shaft 62. Rotor 80 is further comprised of two conductive coils 82 and 84, each of which is disposed facing towards one of magnetic assemblies 68. Windings for first conductive coil 82 facing an upper magnetic assembly 90 are electrically connected 83 to first brush assembly 66, and windings from second conductive coil 84 facing lower magnetic assembly 92 are electrically connected 85 to second brush assembly 67. First and second conductive coils 82 and 84 are further understood by referring to FIGS. 4A and 4B. A first motion device 86 comprising first brush assembly 66, first conductive coil 82 and upper magnetic assembly 90, and a second motion device 88 comprising second brush assembly 67, second conductive coil 84 and lower magnetic assembly 90 will be referenced when discussing operation of multi-functional motor 60. Each motion device is separately capable of creating rotary torque output through voltage applied to its corresponding brush assembly.

Normal operation of multi-functional motor 60 is achieved with a single voltage supply and control system (not shown) common to first and second motion device 86 and 88. Upon command to axially translate the system, one of the motion devices is electrically disconnected from the supply, thus producing no magnetic field. The other motion device continues to be electrically driven, allowing for rotary motion (if necessary) and axial magnetic attraction. Preferably, motion devices 86 and 88 attachment is a parallel electrical configuration. In this way the electric motor 60 of the present invention is able to provide axial movement of actuator shaft 62 (in either of two directions) independently from the rotary movement of actuator shaft 62. It may also be envisioned that these motion devices are configured in series. Configured in series would double the voltage supply to the active motion device (when the other device is disconnected), and thus allowing for a more constant maximum torque output from one or both stators. Motor design must be robust against over voltage problems, such as de-magnetization, insulation, resistive heating, etc.

First and second motion devices 86 and 88 provide actuator shaft 62 with rotary motion which can be used to operate a mechanical device coupled thereto. For instance, in the context of a multi-functional apparatus in a automotive rear liftgate system, a window wiper 46 may be attached to one end of actuator shaft 62 as shown in FIG. 3. A side power window of an automotive, a headlight wiper or other mechanical devices driven by rotary output may also be coupled to actuator shaft 62 of the present invention.

Figure 5A:
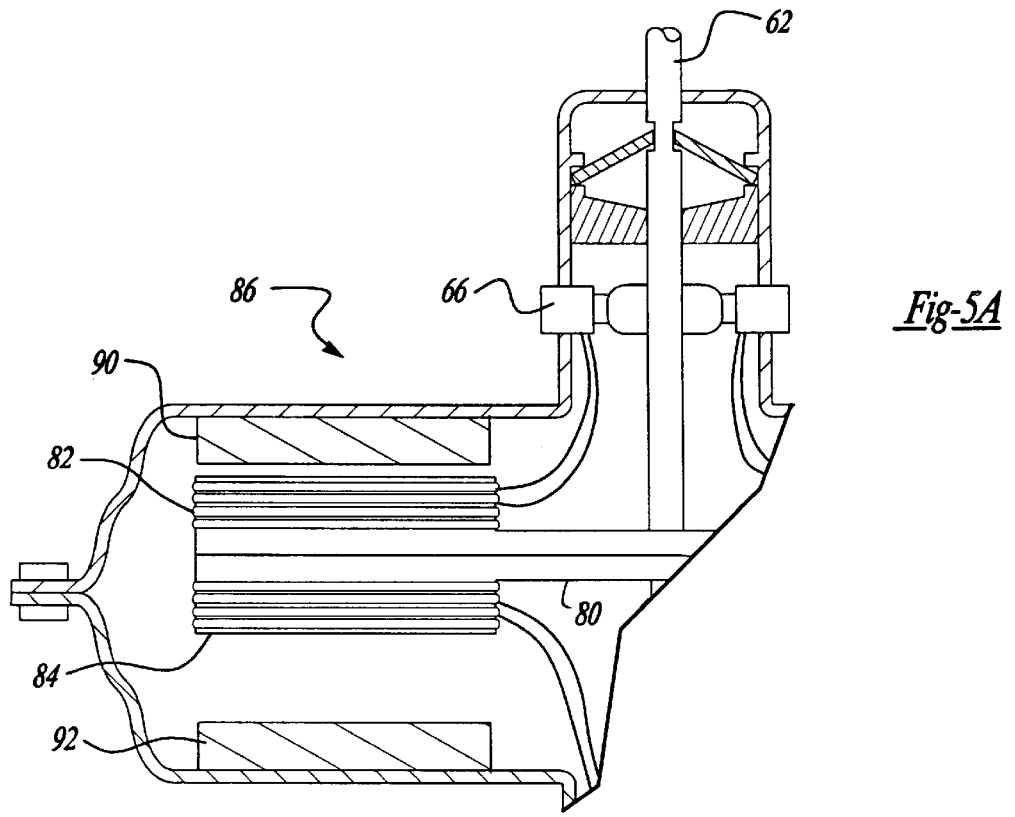
FIG. 5A is a fragmentary sectional view, taken along line 3—3 of FIG. 2, showing the first preferred embodiment of the multi-functional electric motor in an upper axial position.
Figure 5B:
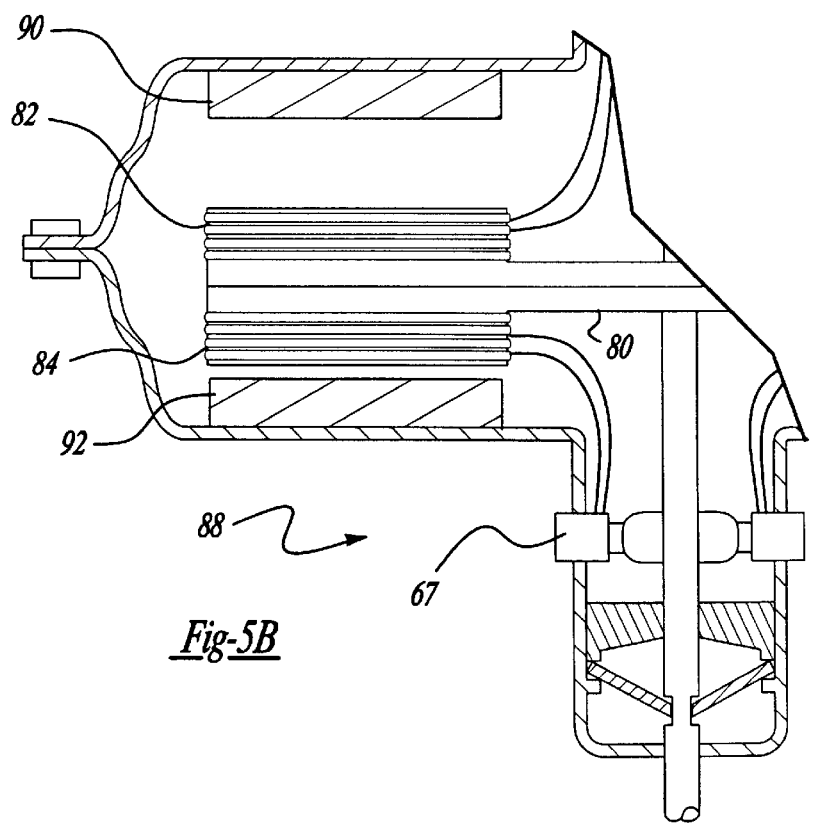
FIG. 5B is a fragmentary sectional view, taken along line 3—3 of FIG. 2, showing the first preferred embodiment of the multi-functional electric motor in a lower axial position.

With regards to axial output the operation of multi-functional electric motor 60 of the present invention can best be understood by referring to FIGS. 5A and 5B. Actuator shaft 62 is initially shown in FIG. 5A in an upper axial position, such that first conductive coil 82 of rotor 80 is shown adjacent to upper magnetic assembly 90. During normal operations of the multi-functional motor 60 (when both motor stators are energized), axial force generated by the system is low, since approximate equivalent magnetic fields exist above first conductive coil 82 and below second conductive coil 84. While the rotor is displaced in an upper axial position, the attractive force in the upwards direction will be greater (for equivalent electrical input into first and second conductive coils 82 and 84) due to the decreased magnetic resistance (i.e., air gap).

Belleville washers 70 deflects related to their spring constant, allowing for small downward axial movement of actuator shaft 62, but otherwise maintaining a stable upper axial position during normal operation. When second conductive coil 84 is energized and first conductive coil 82 is not, a magnetic axial force (parallel to the axis of rotation) attracts rotor 80 towards lower magnetic assembly 92. Upon creating a sufficiently high threshold attractive force between second conductive coil 84 and lower magnetic assembly 92, Belleville washer 70 will "pop" through to a new low energy state with a reverse angle of resistance against actuator shaft 62 as best seen in FIG. 5B. In this lower axial position, second conductive coil 84 of rotor 80 is shown adjacent to lower magnetic assembly 92. Mechanical limitations of axial motion to prevent contact between rotary 80 and magnetic assemblies 68 are well known and may be incorporated into the present invention. The change in axial position by actuator shaft 62 to a lower axial position allows multi-functional motor 60 to actuate another mechanical device coupled to the end of actuator shaft 62. This connection could be through direct link, cam, chain, rod cable or other connection methods. For example, a locking mechanism for the rear liftgate may be actuated by the axial output from multi-functional motor 60. Axial displacement of the actuator shaft will be in the range of ¼ inch for this embodiment.

Figures 6A, 6B:
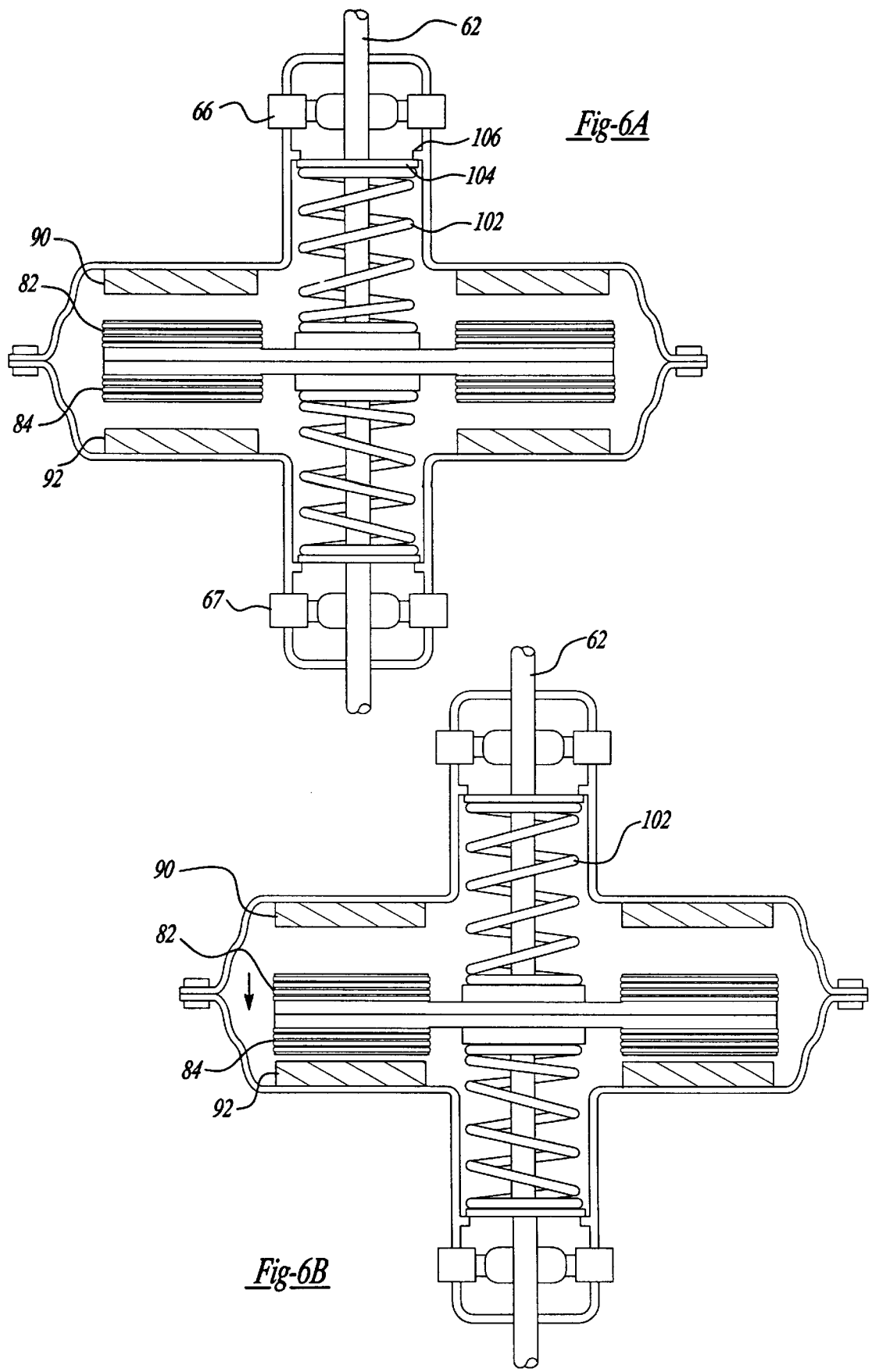
FIG. 6A is a fragmentary sectional view, taken along line 3—3 of FIG. 2, showing a second preferred embodiment of the multi-functional electric motor in a centered axial position.
FIG. 6B is a fragmentary sectional view, taken along line 3—3 of FIG. 2, showing a second preferred embodiment of the multi-functional electric motor in an upper axial position.
Figure 6C:
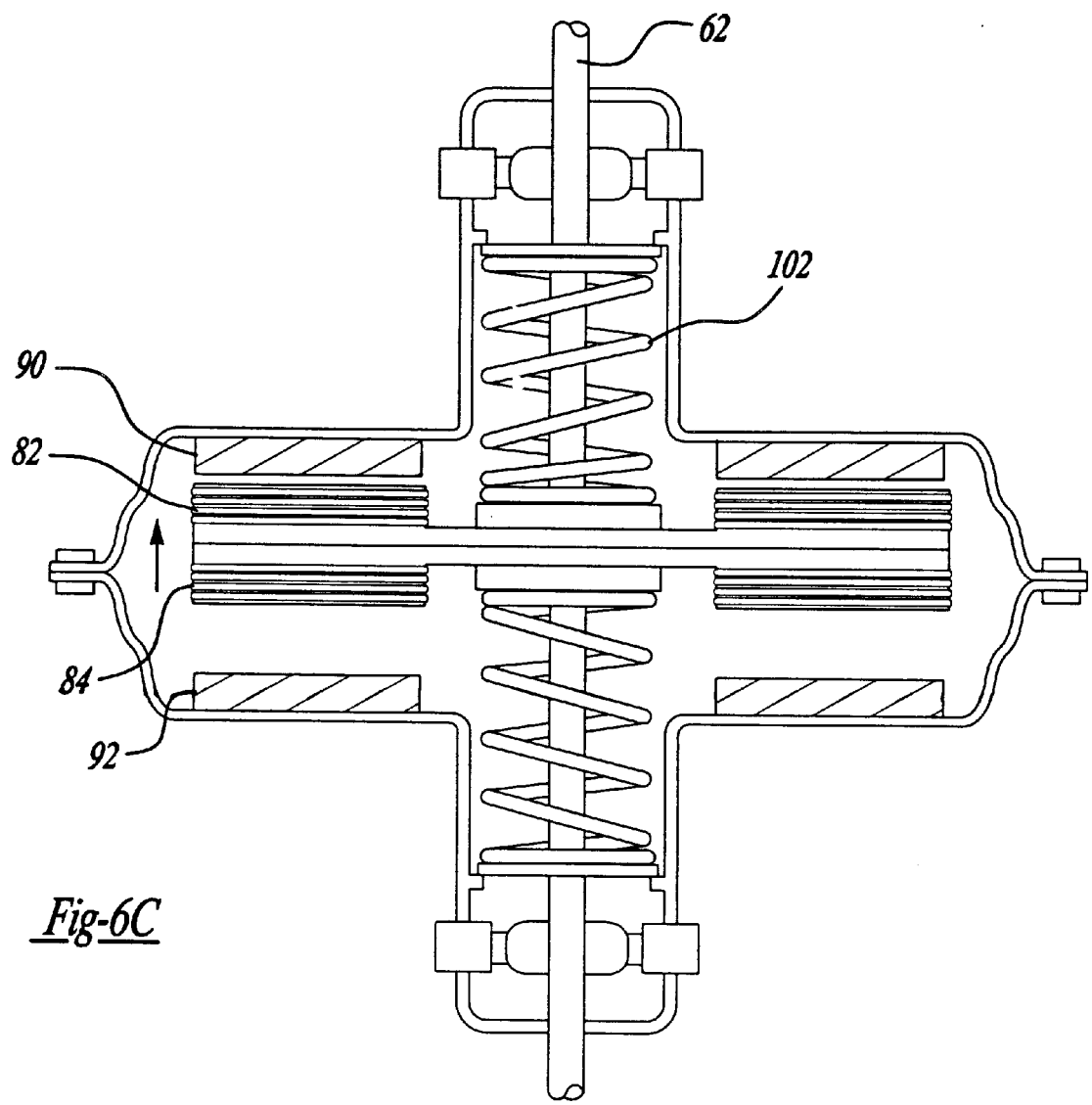
FIG. 6C is a fragmentary sectional view, taken along line 3—3 of FIG. 2, showing a second preferred embodiment of the multi-functional electric motor in a lower axial position.

A second embodiment of the multi-functional motor is shown in FIG. 6A–6C. Generally, multi-functional motor 100 is constructed in the same manner as discussed above. However, Belleville washers have been preferably replaced by a pair of springs 102 that are wound (or positioned) around actuator shaft 62. A single spring utilized in a compression/tension configuration may also be used. Additionally, spring washers, flexures or polymer springs may also be used in this embodiment. A spring seat 104 is attached to the inside surface of motor housing 64 to prevent axial translation of actuating shaft 62. Each spring seat 104 includes a slot (not shown) with a diameter slightly larger than the diameter of actuator shaft 62 to allow for its passage. A lip 106 formed on the inside surface of motor housing 64 allows for each spring 102 to be compressed between its associated spring seat 104 and rotor 80, and thus restricting axial translation of actuator shaft 62. As illustrated in FIG. 6A, spring tension exerted by each spring 102 keeps rotor 80 centered between upper and lower magnetic assembly 90 and 92, and thus establishes a centered axial position. It may also be envisioned that a spring force may be supplied externally by an output device being operated by multi-functional motor 60.

Similar to the first embodiment, a magnetic force generated between first conductive coil 82 and upper magnetic assembly 90, axially translates actuator shaft 62 to an upper axial position as seen in FIG. 6B. In this upper axial position, the upper spring is further compressed, such that when the magnetic force ceases, the upper spring will act to return actuator shaft 62 to its centered axial position. Likewise, a magnetic force generated between second conductive coil 84 and lower magnetic assembly 92, axially translates actuator shaft 62 to a lower axial position shown in FIG. 6C. Unlike the first embodiment which supported two axial positions, this embodiment provides multi-functional motor 100 with three axial positions. Three axial position system allows multi-functional motor 100 to more easily actuate two mechanical systems using the axial output from the motor. In addition, a "push-push" mechanism may be used in conjunction with this embodiment of multi-functional motor 100 to activate the "on" and "off" modes of a function.

A third preferred embodiment employs a brushless dc motor configuration as best seen in FIG. 7. Multi-functional motor 120 comprises a motor housing 64 enclosing a portion of a rotatable actuator shaft 62, with actuator shaft 62 protruding from each end of motor housing 64. Motor stators 124 and 126 are disposed on the inner axial surfaces of motor housing 64, with their active face parallel to the axis of rotation. Actuator shaft 62 is further defined as having a rotor disk 128 with motor rotor components 129 attached axially adjacent to upper and lower stators 124 and 126. These motor rotor components 129 are preferably permanent magnets arranged as is known in the art to create a corresponding magnetic field to interact with stators 124 and 126 induced magnetic field to create rotary motion. Alternatively, these rotor components 129 could be electrically conductive material with a backing core of magnetically conductive material to create an "induction motor". Other motor types, such as switch reluctance or variable reluctance, could also be used in this embodiment. In addition, this embodiment may also incorporate Belleville washers 70 and bushing members 72 as discussed in previous embodiments.

During rotary operation, an angular momentum resultant is present. To axially translate actuator shaft 62, either an upper or lower stator 124 and 126 are momentarily deactivated. Upon deactivation of one of the stators, the other stator continues to supply rotational torque ( if necessary) to actuator shaft 62. Only a small duration is necessary for the axial movement to occur during which rotary motion is continuous. Upon achieving the necessary axial movement, the deactivated stator is again energized to supply 100% torque capability to actuator shaft 62. Belleville washers 70 are again used to maintain a stable axial position during normal operation. It is also envisioned that the springs or other elastic members may also be used to facilitate axial movement (as previously discussed). Various materials have been disclosed in an exemplary fashion, however, other materials may of course be employed. For example, a multi-functional electric motor may have various attachment points for spring elements, and different locations of bushing or bearings. Stator elements can be axially flat or configured in a conical manner with no change in motor capabilities. It should be noted that rotational motion is not necessary while providing axial output. Shaft protrusions may be from one or both sides of the motor housing for actuate various types of systems. For instance, a multi-functional electric motor in the automotive setting may be used to actuate a power window, power door lock and/or power mirror in an automotive side door; to actuate a headlight between the pivotable open/closed position, power headlight wiper and/or a front hood release in an automotive front system; or to actuate a power window wiper and a wash device in an automotive front windshield setting. It is intended by the following claims to cover these and any other departures from the disclosed embodiments which fall within the true spirit of this invention.

The invention claimed is:

1. An electric motor comprising:

a housing;

two magnetic assemblies located in parallel and spaced apart alignment within said housing;

an actuator shaft having a rotatable member extending radially from said actuator shaft, said rotatable member positioned substantially between said magnetic assemblies; and a first conductive coil disposed on a first surface of said rotatable member facing one of said magnetic assemblies and a second conductive coil disposed on a second surface of said rotatable member facing the other of said magnetic assemblies, selectively energizing said first conductive coil and said second conductive coil selectively provides rotary motion of said actuator shaft independently from and in combination with axial motion of said actuator shaft.

2. The electrical motor of claim 1 further comprises a first brush assembly connected to said first conductive coil for energizing said first conductive coil and a second brush assembly connected to said second conductive coil for energizing said second conductive coil.

3. The electrical motor of claim 1 wherein at least one of said first conductive coil and said second conductive coil being energized to provide rotary motion of said actuator shaft.

4. The electrical motor of claim 1 wherein said first conductive coil and said second conductive coil being energized to provide rotary motion of said actuator shaft.

5. The electric motor of claim 4 further comprising a Belleville washer for restricting axial translation of said actuating shaft, said Belleville washer being coupled to the inside surface of said motor housing and engaging said actuator shaft in a first axial position.

6. The electrical motor of claim 5 wherein at least one of said first conductive coil and said second conductive coil being deenergized to axially translate said actuator shaft from said first axial position to a second axial position.

7. The electrical motor of claim 4 further comprising an elastic member being positioned around said actuator shaft on each side of said rotatable member for restricting axial translation of said actuating shaft.

8. The electrical motor of claim 7 wherein said first conductive coil being deenergized to axially translate said actuator shaft from a center axial position to a first axial position and said second conductive coil being deenergized to axially translates said actuator shaft from said center axial position to a second axial position.

9. The electrical motor of claim 7 wherein each of said elastic members are further defined as a spring being aligned between said rotatable member and a spring seat coupled to an inside surface of said motor housing.

10. The electrical motor of claim 1 further comprising:

a window wiper shaft coupled to said actuator shaft and rotatable in response to rotary motion of said actuator shaft; and a lock linkage coupled to said actuator shaft and movable between an unlocking orientation and a locking orientation in response to axial motion of said actuator shaft.

11. The electric motor of claim 1 wherein said housing is further defined as a conical chamber and said magnetic plates being located in spaced apart and angular alignment within said housing.

12. A multi-functional apparatus for use in a motor vehicle, said apparatus comprising:

an actuator shaft;

a first actuable device connected to said actuator shaft;

a second actuable device connected to said actuator shaft; and an axial airgap electric motor being selectively operative to rotate said actuator shaft independently from and in combination with axial translation of said actuator shaft.

13. The multi-functional apparatus of claim 12 wherein said first actuable device being further defined as a window wiper shaft, said window wiper shaft rotatable by said actuator shaft, and said second actuable device being further defined as a lock linkage, said lock linkage axially translated between an unlocked position and a locked position by said actuator shaft.

14. The multi-functional apparatus of claim 12 wherein said electric motor further comprises:

a housing;

two magnetic assemblies located in parallel and spaced apart alignment within said housing, such that a rotatable member of said actuator shaft extending radially from said actuator shaft and positioned substantially between said magnetic assemblies;

a first conductive coil disposed on a first surface of said rotatable member facing one of said magnetic assemblies; and a second conductive coil disposed on a second surface of said rotatable member facing the other of said magnetic assemblies, selectively energizing said first and second conductive coils provides rotary motion of said actuator shaft independently from and in combination with axial motion of said actuator shaft.

15. The multi-functional apparatus of claim 14 further comprises a first brush assembly connected to said first conductive coil for energizing said first conductive coil and a second brush assembly connected to said second conductive coil for energizing said second conductive coil.

16. The multi-functional apparatus of claim 14 wherein at least one of said first conductive coil and said second conductive coil being energized to provide rotary motion of said actuator shaft.

17. The multi-functional apparatus of claim 14 wherein said first conductive coil and said second conductive coil being energized to provide rotary motion of said actuator shaft.

18. The multi-functional apparatus of claim 17 further comprising a Belleville washer for restricting axial translation of said actuating shaft, said Belleville washer being coupled to the inside surface of said motor housing and engaging said actuator shaft in a first axial position.

19. The multi-functional apparatus of claim 18 wherein at least one of said first conductive coil and said second conductive coil being deenergized to axially translate said actuator shaft from said first axial position to a second axial position.

20. The multi-functional apparatus of claim 17 further comprising an elastic member being positioned around said actuator shaft on each side of said rotatable member for restricting axial translation of said actuating shaft.

21. The multi-functional apparatus of claim 20 wherein said first conductive coil being deenergized to axially translate said actuator shaft from a center axial position to a first axial position and said second conductive coil being deenergized to axially translates said actuator shaft from said center axial position to a second axial position.

22. The multi-functional apparatus of claim 20 wherein each of said elastic members are further defined as a spring being aligned between said rotatable member and a spring seat coupled to an inside surface of said motor housing.

23. The multi-functional apparatus of claim 14 wherein said housing is further defined as a conical chamber and said magnetic plates being located in spaced apart and angular alignment within said housing.

24. The multi-functional apparatus of claim 12 wherein said electrical motor further comprises:

a housing;

first and second stator assemblies located in parallel and spaced apart alignment within said housing, such that a rotatable member of said actuator shaft extending perpendicularly from said actuator shaft and positioned between said stator assemblies;

a first magnetic member disposed on a first surface of said rotatable member facing said first stator assembly; and a second magnetic member disposed on a second surface of said rotatable member facing said second stator assembly, selectively energizing said first and second stator assemblies provides rotary motion of said actuator shaft independently from and in combination with axial motion of said actuator shaft.

25. A multi-functional apparatus for use in a motor vehicle, said apparatus comprising:

a housing;

at least two magnetic assemblies located in parallel and spaced apart alignment within said housing;

an actuator shaft having a rotatable member extending radially from said actuator shaft, said rotatable member positioned substantially between said magnetic assemblies;

a first actuable device connected to said actuator shaft;

a second actuable device connected to said actuator shaft; and a first conductive coil disposed on a first surface of said rotatable member facing one of said magnetic assemblies and a second conductive coil disposed on a second surface of said rotatable member facing the other of said magnetic assemblies, selective energization said first conductive coil and said second conductive coil to actuate said actuator shaft, wherein actuation of said actuator shaft selected from the group comprising rotary motion of said actuator shaft without axial motion of said actuator shaft, axial motion of said actuator shaft without rotary motion of said actuator shaft, and rotary and axial motion of said actuator shaft.

* * * * *